United States Patent
McGrath et al.

(10) Patent No.: US 10,460,524 B2
(45) Date of Patent: Oct. 29, 2019

(54) ROLL TURNING AND TAP TURNING FOR VIRTUAL REALITY ENVIRONMENTS

(71) Applicant: Microsoft Technology Licensing, LLC, Redmond, WA (US)

(72) Inventors: Michael D. McGrath, Monroe, WA (US); Tommaso Checchi, Stockholm (SE); Soren Hannibal Nielsen, Kirkland, WA (US); Robert Poerschke, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 15/335,295

(22) Filed: Oct. 26, 2016

(65) Prior Publication Data
US 2018/0012419 A1 Jan. 11, 2018

Related U.S. Application Data

(60) Provisional application No. 62/358,933, filed on Jul. 6, 2016.

(51) Int. Cl.
*G06T 19/20* (2011.01)
*A63F 13/214* (2014.01)
(Continued)

(52) U.S. Cl.
CPC ............ *G06T 19/20* (2013.01); *A63F 13/214* (2014.09); *A63F 13/24* (2014.09); *A63F 13/42* (2014.09); *A63F 13/428* (2014.09); *A63F 13/56* (2014.09); *G06F 3/033* (2013.01); *G06F 3/0338* (2013.01); *G06F 3/0354* (2013.01); *A63F 2300/10* (2013.01); *A63F 2300/5553* (2013.01); *A63F 2300/6045* (2013.01); *A63F 2300/6607* (2013.01); *A63F 2300/6676* (2013.01); *A63F 2300/8082* (2013.01); *G06F 3/011* (2013.01);
(Continued)

(58) Field of Classification Search
CPC ........ A64F 13/00; A63F 13/214; A63F 13/24; A63F 13/42; A63F 2300/6045; A63F 13/428; A63F 13/56; G06F 3/038; G06F 3/0338; G06F 3/0354; G06T 19/20; G06G 3/033
USPC .......................................................... 463/6
See application file for complete search history.

(56) References Cited

U.S. PATENT DOCUMENTS 6,267,673 B1   7/2001   Miyamoto et al.
8,961,313 B2   2/2015   Zalewski
(Continued)

OTHER PUBLICATIONS

"Real World Third Person Perspective VR / AR Experiment", Published on: Jun. 25, 2014, 3 pages Available at: https://www.youtube.com/watch?v=RgBeRP4dUGo.
(Continued)

*Primary Examiner* — David Duffy
*Assistant Examiner* — Ankit B Doshi
(74) *Attorney, Agent, or Firm* — Ray Quinney & Nebeker P.C.; John O. Carpenter

(57) ABSTRACT

Technologies are described for providing turning in virtual reality environments. For example, some implementations use roll turning that involves rotating around an outer edge of a control input, some implementations use tap turning to move directly to a location indicated by a control movement, and some implementations involve combinations of roll turning and tap turning.

20 Claims, 7 Drawing Sheets

(51) Int. Cl.

| | |
|---|---|
| *A63F 13/24* | (2014.01) |
| *G06F 3/0338* | (2013.01) |
| *G06F 3/033* | (2013.01) |
| *G06F 3/0354* | (2013.01) |
| *A63F 13/428* | (2014.01) |
| *A63F 13/42* | (2014.01) |
| *A63F 13/56* | (2014.01) |
| *G06F 3/01* | (2006.01) |
| *G06F 3/0481* | (2013.01) |
| *G06N 3/00* | (2006.01) |

(52) U.S. Cl.
CPC .......... *G06F 3/017* (2013.01); *G06F 3/03547* (2013.01); *G06F 3/03549* (2013.01); *G06F 3/04815* (2013.01); *G06N 3/006* (2013.01)

(56) References Cited

U.S. PATENT DOCUMENTS

| | | | |
|---|---|---|---|
| 9,144,744 | B2 | 9/2015 | Langlois et al. |
| 9,616,340 | B2* | 4/2017 | Wakazono .............. A63F 13/57 |
| 9,791,860 | B2* | 10/2017 | Phillips ................ G05D 1/0033 |
| 2007/0072662 | A1 | 3/2007 | Templeman |
| 2008/0215974 | A1 | 9/2008 | Harrison et al. |
| 2018/0028917 | A1* | 2/2018 | Poerschke ............. A63F 13/537 |

OTHER PUBLICATIONS

Bruce, Cymatic, "GDC 2014 Video Interview—New Demo and Design Innovations from Cloudhead Games", Published on: Mar. 22, 2014, 3 pages Available at: http://www.roadtovr.com/gdc-2014-new-demo-design-innovations-cloudhead-games/.

"What Will VR and Oculus do to 3rd Person Games?", Retrieved on: Jun. 27, 2016, 11 pages Available at: http://www.neogaf.com/forum/showthread.php?t=970940.

"How Important are Physical Motions for Effective Spatial Orientation in VR?", Published on: Apr. 14, 2016, 1 page Available at: https://www.worldviz.com/studies/simon-fraser-university-ispace-lab/.

Shanklin, Will, "State of the Game: Virtual Reality", Published on: Jan. 26, 2016, 16 pages Available at: http://www.gizmag.com/virtual-reality/41506/.

Chen, et al., "6DoF Navigation in Virtual Worlds: Comparison of Joystick-based and Head-controlled Paradigm", In Proceedings of the 19th ACM Symposium on Virtual Reality Software and Technology, Oct. 6, 2013, 4 pages.

"How are 3rd person games in VR?", Retrieved on: Jun. 27, 2016, 5 pages Available at: https://www.reddit.com/r/Games/comments/3rsp0n/how_are_3rd_person_games_in_vr/.

Denisova, et al., "First Person vs. Third Person Perspective in Digital Games: Do Player Preferences Affect Immersion?", In Proceedings of the 33rd Annual ACM Conference on Human Factors in Computing Systems, Apr. 18, 2015, 4 pages.

"Fighting Motion Sickness due to Explicit Viewpoint Rotation", Published on: Apr. 4, 2014, 5 pages Available at: http://doc-ok.org/?p=872.

"Turning around in 3rd person VR games", Retrieved on: Jun. 27, 2016, 6 pages Available at: https://forums.oculus.com/community/discussion/37940/turning-around-in-3rd-person-vr-games.

Alker, Alexander, "The Role of Head Movements in Simulator Sickness Generated by a Virtual Environment", In Master Thesis, May 2008, 102 pages.

"International Search Report and Written Opinion Issued in PCT Application No. PCT/US2017/039849", dated Aug. 23, 2017, 15 Pages.

* cited by examiner

FIG. 1

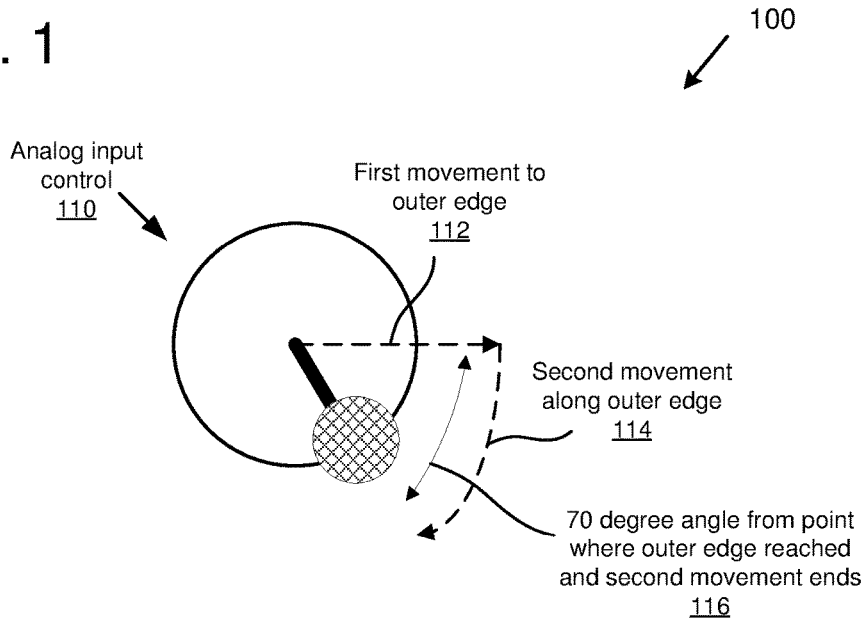

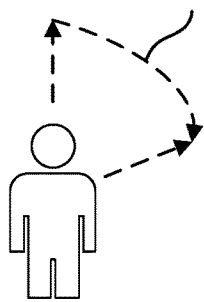

First Example of turning result (no scaling)
120

Element in virtual environment (e.g., avatar) turns 70 degrees to the right
125

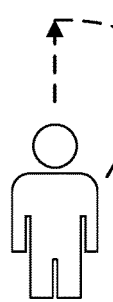

Second Example of turning result (with scaling of 0.5)
130

Element in virtual environment (e.g., avatar) turns 35 degrees to the right
135

Third Example of turning result (with stuttering in 18 degree increments)
140

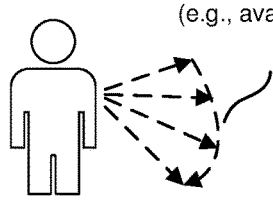

Element in virtual environment (e.g., avatar) turns 54 degrees to the right
145

FIG. 2

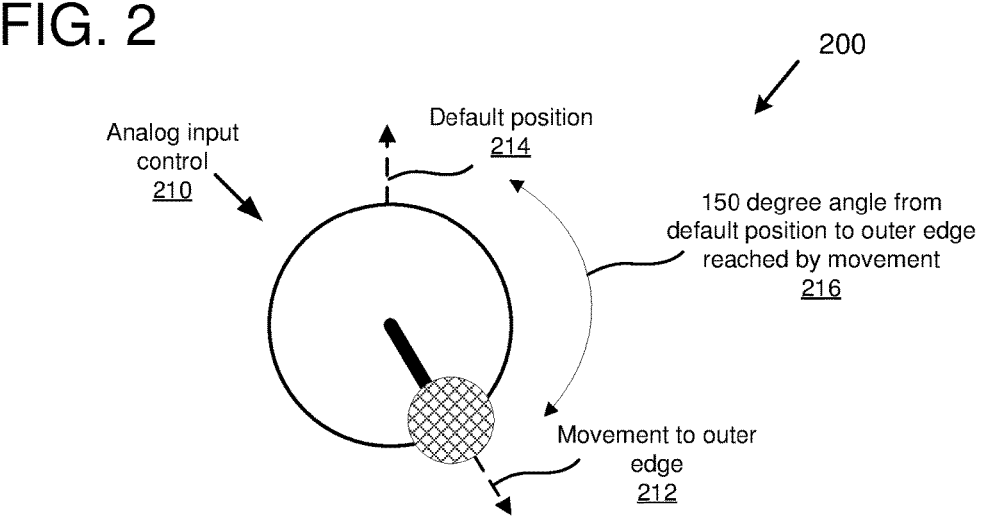

Analog input control 210

Default position 214

150 degree angle from default position to outer edge reached by movement 216

Movement to outer edge 212

200

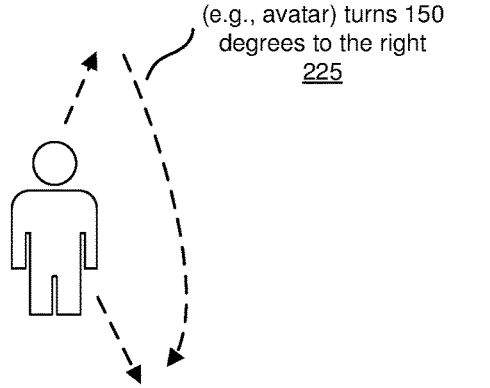

First Example of turning result (no scaling) 220

Element in virtual environment (e.g., avatar) turns 150 degrees to the right 225

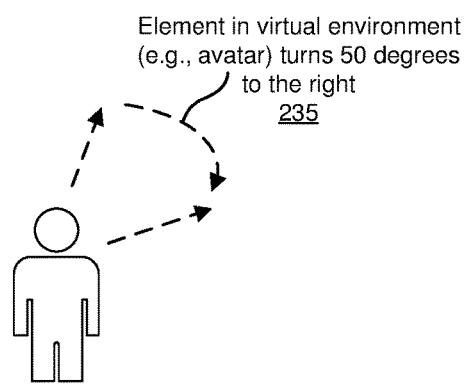

Second Example of turning result (with scaling of 1/3) 230

Element in virtual environment (e.g., avatar) turns 50 degrees to the right 235

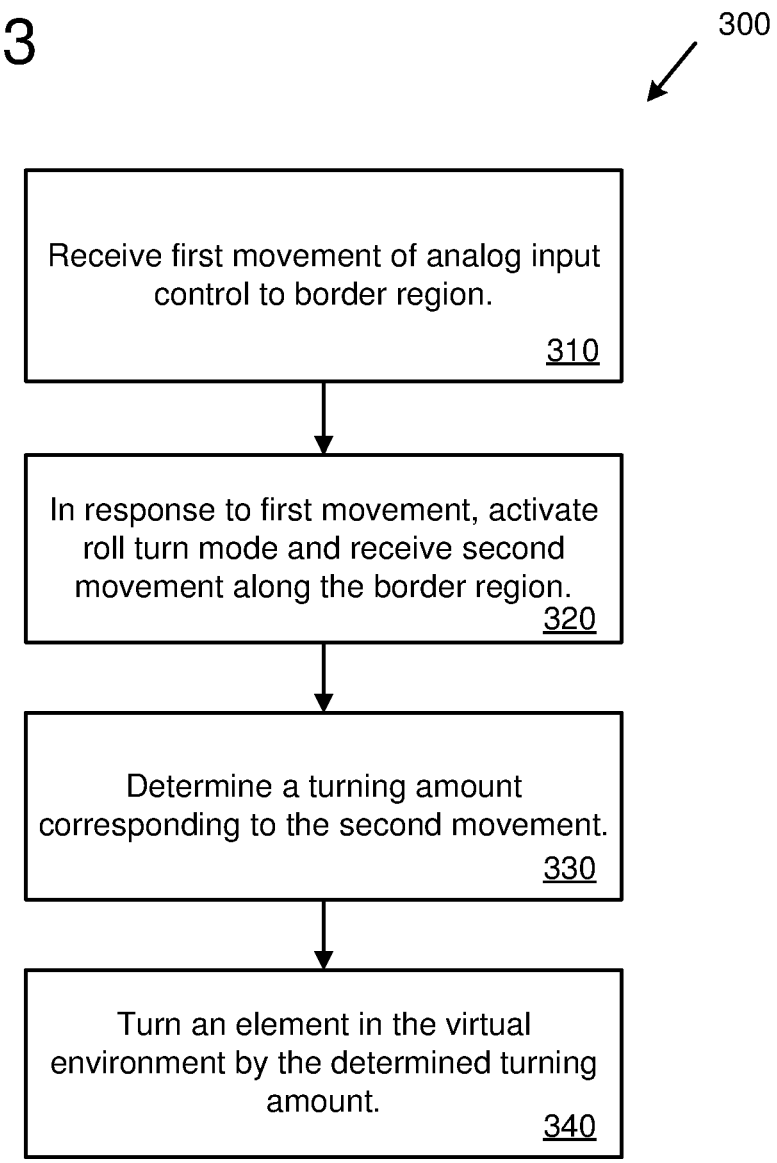

SOFTWARE 780 IMPLEMENTING DESCRIBED TECHNOLOGIES

ROLL TURNING AND TAP TURNING FOR VIRTUAL REALITY ENVIRONMENTS

BACKGROUND

Providing a comfortable experience for users in a virtual reality environment is important. In some situations, standard virtual reality controls provide an unsettling experience for the user. For example, a typical turning control in a virtual reality environment turns the user for an amount corresponding to the length of time the control is held, which can provide an unsettling experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for providing turning in virtual reality environments. Some implementations use roll turning that involves rotating around an outer edge of a control input. For example, a first movement to an outer edge of an analog input control can be received. In response, a roll turn mode can be activated and a second movement along the outer edge can be received. A turning amount corresponding to the second movement can be determined and an element in a virtual environment (e.g., a user's avatar) can be turned by the turning amount.

Some implementations use tap turning to move directly to a location indicated by a control movement. For example, a movement of an analog input control can be received to a point on an outer edge of the control. In response, a tap turn action can be performed by determining an angle and direction from a default position to the point. An element in the virtual environment can then be turned proportional to the determined angle and direction.

Some implementations involve combinations of roll turning and tap turning. For example, a tap turn can be performed by moving an analog control input to a point on an outer edge and a roll turn can be performed by moving the control along the outer edge.

BRIEF DESCRIPTION OF THE DRAWINGS

FIG. 1 is a diagram depicting an example of roll turning in a virtual reality environment.

FIG. 2 is a diagram depicting an example of tap turning in a virtual reality environment.

FIG. 3 is a diagram depicting an example method for roll turning in a virtual reality environment.

DETAILED DESCRIPTION

Overview

Figure 4:
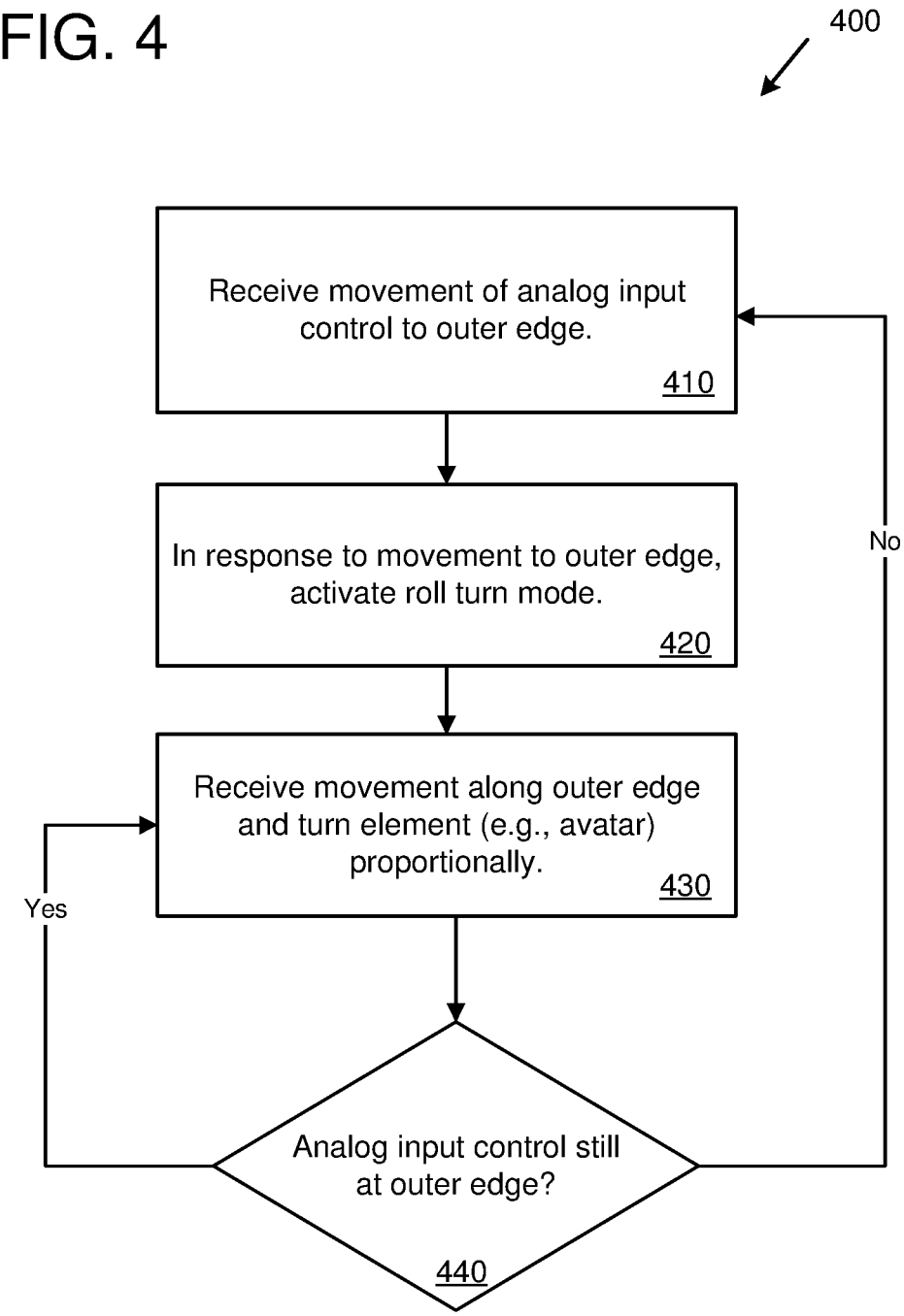
FIG. 4 is a diagram depicting another example method for roll turning in a virtual reality environment.

As described herein, various technologies are described for turning in virtual environments (also called virtual reality environments), which can include virtual environments implemented using virtual reality and/or augmented reality. Some implementations use roll turning that involves rotating around an outer edge of a control input, some implementations use tap turning to move directly to a location indicated by a control movement, and some implementations involve combinations of roll turning and tap turning.

The technologies described herein for turning in virtual environments utilize an analog input control. In some implementations, the analog input control is an analog stick of a game controller. In some implementations, the analog input control is another type of control that supports two axes (x and y) of control movement, such as a touchpad, mouse, or trackball. In some implementations, the analog input control receives input that represents a 2-axis control, such as a gesture recognition system (e.g., part of an augmented reality device) that can recognize a movement as corresponding to movement of a virtual 2-axis analog input control.

VR (virtual reality) and AR (augmented reality) devices provide additional axes for head pitching, and fine-tuned horizontal turning, via head/gaze control. By utilizing a second stick on a traditional dual-analog gamepad design (or any analog or dual-analog design, inclusive of sticks, trackballs, touchpads, etc.) in a different way it becomes possible to enable smooth, comfortable turning in VR environments for first-person and third-person experiences.

By treating one sticks borderline area or border region (e.g., the area at the edges of the area the stick can extend to, also called the outer edge) as a control region, an application can use the direction the stick points in as a relative direction-change directive. Upon first reaching the border region, the difference between a predetermined "forward" or "default" direction, and the current stick direction can apply an "instant-turn" delta angle to the user's in-game avatar. In addition, or alternatively, if the stick is held at the border region, and then treated as a "wheel", while rotating around the border region, changes in stick direction can be applied directly, or in scaled fashion, to the user's avatar facing direction. The concept of a border region on a control stick can be extended to include touchpad rotational movement, trackball rotational movement, and movement of other input controls that have a border region. Described roll and tap turning actions can also be performed using a gesture based control system (e.g., performing a gesture corresponding to a movement to an outer edge or movement around the outer edge). In some implementations, the border region of an analog input control refers to an area of the control outside the center or default location. For example, with some analog input controls, the border region is a visual and/or tactile area (e.g., visual and/or tactile circles representing borders between different areas of a touch surface) that may or may not be at the limit of the control movement. For example, a touch surface may have a raised circular area that a user can feel with the user's finger or thumb providing tactile feedback in order to activate and use the roll and/or tap turning technologies described herein. With some analog input controls, the border region is an outer edge at the limit of the control movement. For example, a game controller stick may be moved to an outer edge at the physical limit of stick movement. As another example, a finger on a touch pad may be moved to a physical outer edge of the touch pad.

Previous incarnations of virtual reality control schemes (on gamepads, and similar devices) have copied standard console controls for first-person and third-person experiences, or used a modified version of those controls, with stuttered (by time or angle) "comfort" turns, to allow the user's senses to bypass VR motion comfort issues. For example, with previous solutions, moving the control stick to the right causes the avatar to turn right while the control stick is held in that direction, with the amount of turning corresponding to the length of time the control stick is held.

The technical solutions described herein provide an effective, comfortable turning alternative for VR experiences which do not rely on standard, or stuttered standard, rotation controls. Many VR users find standard controls unsettling, and stuttered controls to be lacking the immersive quality which contribute to an enjoyable VR experience. For example, standard solutions which rely on the length of time the control is held down can be unsettling because there is no relation between the direction and/or amount of movement of the control and the corresponding movement of the avatar. In contrast, the turning solutions described herein provide an improved experience because the direction and/or amount of movement of the control directly corresponds to the movement of the avatar. For example, the user could perform a tap turn 120 degrees to the right on an analog control stick (in relation to a default forward facing direction) which results in the in-game avatar also turning 120 degrees to the right (or in some implementations a scaled amount). This direct relation between the control movement and the avatar movement provides a more comfortable experience (e.g., by connecting what the user's hand and brain expect to see from the movement with the corresponding action in the virtual reality experience). For example, the technologies described herein provide feedback corresponding to the direction and amount of turning which helps the user feel comfortable because there is a direct connection between what the user's hand is doing (muscular feedback) and what the user's brain expects to see in the virtual environment (e.g., the user moves the control 120 degrees to the left and the user's avatar turns a an equal, or scaled, amount to the left).

In addition, the turning solutions described herein can provide improved turning precision and speed. For example, the user can tap turn to any desired direction (e.g., a complete 180 degree turn with just a single tap action). As another example, with roll turning, the user can turn to any desired angle (e.g., 54 degrees, 55 degrees, fractions of a degree, etc.) and finely control the angle by rotating around the edge of the control. As another example, with roll turning the user can control the speed of the rotation by moving the control slow (causing the avatar to turn slowly) or fast (causing the avatar to turn fast).

In addition to providing an improved comfort experience over previous solutions, the roll/wheel turning mechanism provides a user-controllable rotational speed equivalent, and in some ways more accurately when combined with head-mounted display fine tuning, than mouse turning does in keyboard plus mouse driven experiences.

Additionally, games which typically require wheel-based motion for control, like driving simulators, can benefit from the roll/wheel solutions, both in VR and in normal (non-VR) game experiences. Other types of computer games can utilize the technologies described herein as well, such as games that use a fixed camera pitch (e.g., a real-time strategy games or games that use a fixed camera view)

In a first-person or third-person experience, a VR headset can be utilized to provide minor turning via horizontal rotations, as well as pitching. Once these elements are available, the "turning stick" (traditionally the right stick) on a gamepad is freed. Typical experiences use only the horizontal axis of the right stick, to provide a "choppy" turning experience, known to allow the human brain to adjust better to the turning experience, not producing motion comfort issues. In order to provide an improved experience, implementations are described which uses both axes of the turning-stick to provide a 2D vector, an angle between vectors can be determined, and utilized for both tap turning, and roll turning.

In some implementations, on the frame when the turning-stick is pressed to reach a predetermined border region, a relative angle between a predetermined "forward" direction (usually "up" on the stick), and the direction indicated by the direction given by the two stick axes is computed. This angle is then applied directly or scaled, and instantly, as a tap turn, providing the same motion comfort as the stutter turn mechanism described above. Subsequently, or alternately, as the stick is held at the border limit, and rolled around the outer edge, relative angle changes can be applied directly, or in scaled fashion, to the player's avatar. These angle changes can be smooth, or can be stuttered for extra comfort in VR.

Roll Turning

In the technologies described herein, roll turning in a virtual environment occurs when the user moves the analog input control to the outer edge and then moves along the outer edge in a direction, either clockwise or counter-clockwise. No turning occurs until the control is moved to the outer edge and beings to move along the outer edge. Turning of the element in the virtual environment (e.g., the user's avatar) then occurs during, and in proportion to, the movement along the outer edge. In some implementations, a roll turn mode is enabled when the control is moved to the outer edge (e.g., and held in that position). In some implementations, the roll turn mode is enabled when the control is moved to the outer and beings to move along the outer edge. In some implementations, the roll turn mode is enabled in another way, such as by pressing a button on a game controller, pressing a key, performing a gesture, etc. Roll turning is also called wheel turning. In some implementations, roll turning is performed in relation to a border region of the analog input control, which may be at the outer edge or at another border area of the analog input control.

FIG. 1 is a diagram 100 depicting an example of roll turning in a virtual reality environment. As depicted in the diagram 100, an analog input control 110 is used to control an element in a virtual reality environment (in this example, a user's avatar in a first-person or third-person virtual reality environment). In implementations where the element in the virtual reality environment is an avatar, turning is performed by rotating the avatar's body or camera orientation. For example, a typical avatar may have separate head and body rotation (e.g., the user can look around using movement of the user's head while rotation involves rotating the avatar's body to a new direction). In implementations where there is no separate head and body orientation (e.g., head and body have the same orientation or there is no separate concept of head and body), then turning is performed for the single orientation.

The analog input control 110 is depicted as an analog stick of a game controller. However, the analog input control 110 could be another type of control, such as a touchpad, trackball, mouse, or gesture recognition system.

In the roll turning example, the analog input control 110 has been moved to an outer edge using a first movement, as depicted at 112. The analog input control 110 has then been moved along the outer edge, as depicted at 114. In this example, the distance that the control has been moved along the outer edge, depicted at 114, results in a 70 degree angle from the point where the outer edge was reached to the point where the second movement ends, as depicted at 116. As the movement along the outer edge occurs, the element in the environment turns a proportional amount (e.g., with a smooth or stuttered turning motion). Therefore, the element in the environment turns during the movement along the outer edge and does not wait for the movement to end. In some implementations, the turning amount is scaled.

A number of example results of how an avatar is turned in the virtual reality environment, as a result of the first and second movements depicted at 112 and 114, are depicted in order to illustrate the roll turning mode. In the first example 120, the avatar turns 70 degrees to the right, as depicted at 125. In the first example 120, no scaling is applied so the avatar turns 70 degrees (in direct one-to-one relation to the control movement along the outer edge, as depicted at 116). The 70 degree turning (or rotation) starts from the current facing of the avatar and then turns 70 degrees to the right (or clockwise). While the avatar in the first example 120 begins facing the top of the figure, in general the avatar may begin facing any direction and then rotate 70 degrees to the right to accomplish the roll turn.

In the second example 130, the avatar turns 35 degrees to the right from the avatar's starting facing, as depicted at 135. In the second example, the turning amount (70 degrees, as depicted at 116) is scaled by one-half (0.5). Other scaling amounts can be used, such as one-third or one-quarter. In some implementations, the scaling amount is a user-configurable setting.

In the third example 140, the avatar turns 54 degrees to the right from the avatar's starting facing, as depicted at 145. In the third example 140, the turning is applied with stuttering in 18 degree increments. Therefore, the 70 degree turning amount is segmented into three individual 18 degree turns from the avatar's starting facing, as depicted at 145. In this example, the remaining 16 degrees (70 minus 54) is not enough to complete another 18 degree increment. Other stuttering increments can be used instead of 18 degrees. In some implementations, the stuttering amount is a user-configurable setting.

Tap Turning

In the technologies described herein, tap turning in a virtual environment occurs when the user moves the analog input control to the outer edge. Once the tap turn action is activated (e.g., once the analog input control reaches the outer edge or reaches the outer edge and begins to return to the center or starting position) a turning amount is determined and applied proportionally to turn the element in the virtual environment (e.g., to turn the user's avatar). In some implementations, tap turning immediately turns the avatar to the new facing, without performing a smooth rotation to the new facing. Turning is not repeated if the user holds the control at the outer edge. In some implementations, the possible facings are divided (also called bucketed) so that there are limited number of possible facings that the user can tap turn to (e.g., every 15 degrees). In some implementations, tap turning is performed in relation to a border region of the analog input control, which may be at the outer edge or at another border area of the analog input control.

FIG. 2 is a diagram 200 depicting an example of tap turning in a virtual reality environment. As depicted in the diagram 200, an analog input control 210 is used to control an element in a virtual reality environment (in this example, a user's avatar in a first-person or third-person virtual reality environment). The analog input control 210 is depicted as an analog stick of a game controller. However, the analog input control 210 could be another type of control, such as a touchpad, trackball, mouse, or gesture recognition system. In implementations where the element in the virtual reality environment is an avatar, turning is performed by rotating the avatar's body or camera orientation. For example, a typical avatar may have separate head and body rotation (e.g., the user can look around using movement of the user's head while rotation involves rotating the avatar's body to a new direction). In implementations where there is no separate head and body orientation (e.g., head and body have the same orientation or there is no separate concept of head and body), then turning is performed for the single orientation.

In the tap turning example, the analog input control 210 has been moved to an outer edge using a movement, as depicted at 212. The analog input control 210 has then been moved to the center location. Upon activating the tap turn action (e.g., once the analog input control 210 reaches the outer edge or beings to move back to the center location), an angle is determined between the default position 214 and the point where the movement reaches the outer edge. In this example, the angle is 150 degrees, as depicted at 216. In some implementations, the default position 214 may be in a different direction or may be a user-configurable setting. Once the tap turn is activated, an element in the virtual environment (e.g., the user's avatar) immediately turns an amount proportional to the determined angle (e.g., the user's avatar will be at the new facing immediately after the tap turn action). In some implementations, the turning amount is scaled.

A number of example results of how an avatar is turned in the virtual reality environment, as a result of the movements depicted at 212, are depicted in order to illustrate the tap turning mode. In the first example 220, the avatar turns 150 degrees to the right, as depicted at 225. In the first example 220, no scaling is applied so the avatar immediately turns 150 degrees once the tap turn action is performed (as depicted at 212). The 150 degree turning (or rotation) starts from the current facing of the avatar and then turns 150 degrees to the right (or clockwise). While the avatar in the first example 220 begins facing the top of the figure, in general the avatar may begin facing any direction and then rotate 150 degrees to the right to accomplish the tap turn.

In the second example 230, the avatar turns 50 degrees to the right from the avatar's starting facing, as depicted at 235. In the second example, the angle (150 degrees, as depicted at 216) is scaled by one-third. Other scaling amounts can be used, such as one-half or one-quarter. In some implementations, the scaling amount is a user-configurable setting. Tap turning can also be performed using a stuttered movement.

Turning Implementations

In the technologies described herein, different turning options can be applied to the roll turning and/or tap turning modes. In some implementations, tap turning or roll turning is applied using a smooth motion without stuttering. For example, a tap turn by a particular angle amount can be performed by smoothly rotating the user's avatar by the angle amount at a particular speed (e.g., a default or user-selectable speed).

In some implementations, tap turning or roll turning is applied using a stuttered motion. Stuttering can be applied by time or by stuttering increments. When stuttering is applied by time, the overall turning amount is broken up a number of times per second (e.g., a default or user-configurable number of times per second, such as six times per second). For example, an overall turning amount that takes one second to complete can be broken up into one-sixth second increments.

When stuttering is applied by stuttering increments, the overall turning amount is broken up into a number of segments with brief pauses after each segment. For example, if stuttering is applied in 18 degree increments, then a 54 degree overall turning amount will be broken up into three stuttering increments, with brief stops at 18 degrees and 36 degrees.

In the technologies described herein, settings can be provided (e.g., via user interfaces such as graphical user interfaces) for configuring various turning options. For example, a graphical user interface can be provided for configuring turning settings within an application (e.g., a video game application). Settings can include user configurable settings to enable or disable various turning modes (e.g., enable or disable a roll turning mode, a tap turning mode, or a combined mode), configure turning options (e.g., adjust sensitivity settings), and/or to configure other options (e.g., a default direction to use for tap turning, configuration of gestures to perform tap and/or roll turning, turning speed, stuttering configuration, etc.).

Example Methods for Turning in Virtual Environments

In the technologies described herein, methods can be provided for performing roll turning, tap turning, or a combination of roll turning and tap turning.

FIG. 3 is a flowchart of an example method 300 for roll turning in a virtual reality environment (e.g., for rotating a user's avatar in the virtual reality environment). At 310, a first movement is received via an analog input control. The first movement is a movement of the analog input control to a border region of the analog input control. In some implementations, the first movement is to an outer edge of the analog input control.

At 320 a roll turn mode is activated in response to the first movement. For example, the roll turn can be activated once the border region is reached, or once the border region is reached and held for a period of time (e.g., a pre-determined or user-configurable threshold amount of time). After the roll turn mode is activated a second movement is received via the analog input control along the border region.

At 330, a turning amount (e.g., a number of degrees) corresponding to the second movement is determined. The turning amount can be scaled by a scaling factor (e.g., one-half, one-third, etc.).

At 340, an element in the virtual reality environment is turned by the amount determined at 340. Turning can be performed in a smooth or stuttered manner.

FIG. 4 is a flowchart of an example method 400 for roll turning in a virtual reality environment (e.g., for rotating a user's avatar in the virtual reality environment). At 410, movement is received via an analog input control. The movement is a movement of the analog input control to an outer edge of the analog input control.

At 420 a roll turn mode is activated in response to the movement received at 410. For example, the roll turn can be activated once the outer edge is reached, or once the outer edge is reached and held for a period of time (e.g., a pre-determined or user-configurable threshold amount of time).

Once the roll turn mode is active, at 430 movement of the analog input control is received along the outer edge. The movement along the outer edge turns the element in the virtual environment (e.g., the user's avatar) proportional to the amount of movement (e.g., a one-to-one mapping of the angle of the movement to the angle of the turning, or a scaled amount).

At 440, the method may continue with additional turning or return to the start and wait for the roll turn to be activated again. Specifically, if the analog input control continues to move along the outer edge, then the method proceeds from 440 to 430 to perform more turning proportional to the additional movement. However, if the analog input control is moved away from the outer edge (e.g., back to the center of the control, then the method proceeds from 440 to 410, where the roll turn would be initiated again if the analog input control moves back to the outer edge.

Figure 5:
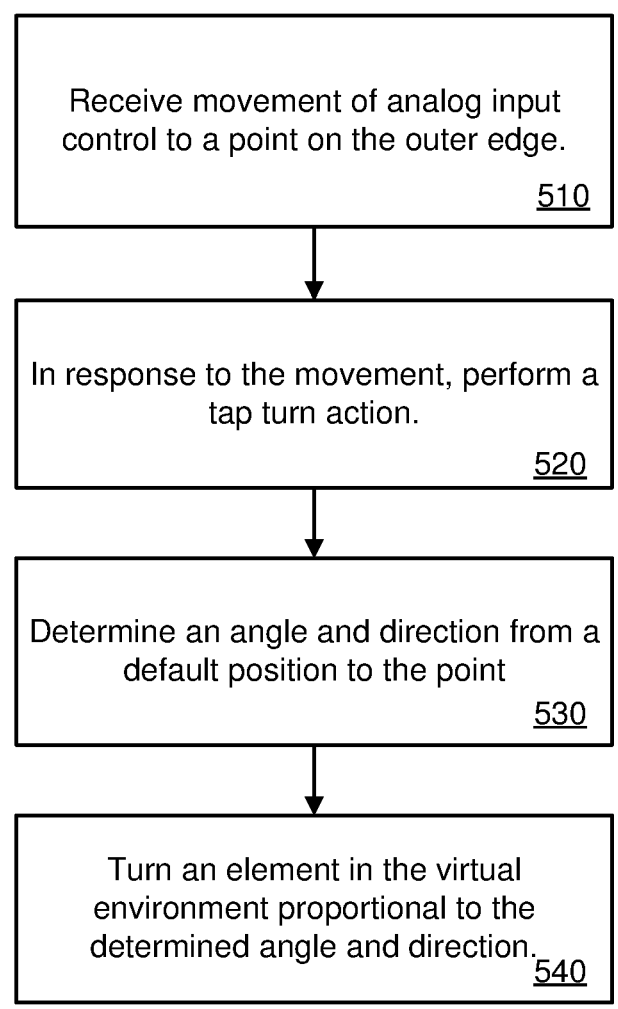
FIG. 5 is a diagram depicting an example method for tap turning in a virtual reality environment.

FIG. 5 is a flowchart of an example method 500 for tap turning in a virtual reality environment (e.g., for rotating a user's avatar in the virtual reality environment). At 510, a movement is received via an analog input control. The movement is a movement of the analog input control to a point on the outer edge of the analog input control. In some implementations, the movement starts from a center location of the analog input control and then moves to the point on the outer edge.

At 520 a tap turn action is performed in response to the movement received at 510. The tap turn action is performed by determining an angle and a direction from a default position to the point on the outer edge, as depicted at 530. In some implementations, the default position is at the top or forward position of the analog input control. Other implementations may use a different default position, or a user-configurable default position. The element in the virtual environment is then turned proportional to the determined angle and in the determined direction, as depicted at 540. In some implementations, the amount turned is equal to the determined angle (a one-to-one relationship). In some implementations, the amount turned is scaled (e.g., by one-half, one-third, or by another amount, which could be a default setting or a user-configurable setting). In some implementations, the turning is performed in a stuttered manner.

The example method 500 can be performed to turn the element in the virtual environment (e.g., the user's avatar) by any desired amount. For example, by performing a single tap turn action (e.g., one movement of the analog input control to a point on the outer edge), the user can initiate an immediate turn of the user's avatar by the selected amount (e.g., a 30 degree turn, 50 degree turn, 170 degree turn, or any other desired amount). In this way, the user can initiate an immediate turn by an arbitrary amount proportional (one-to-one or scaled) to the location on the outer edge where the user moves the analog input control.

Figure 6:
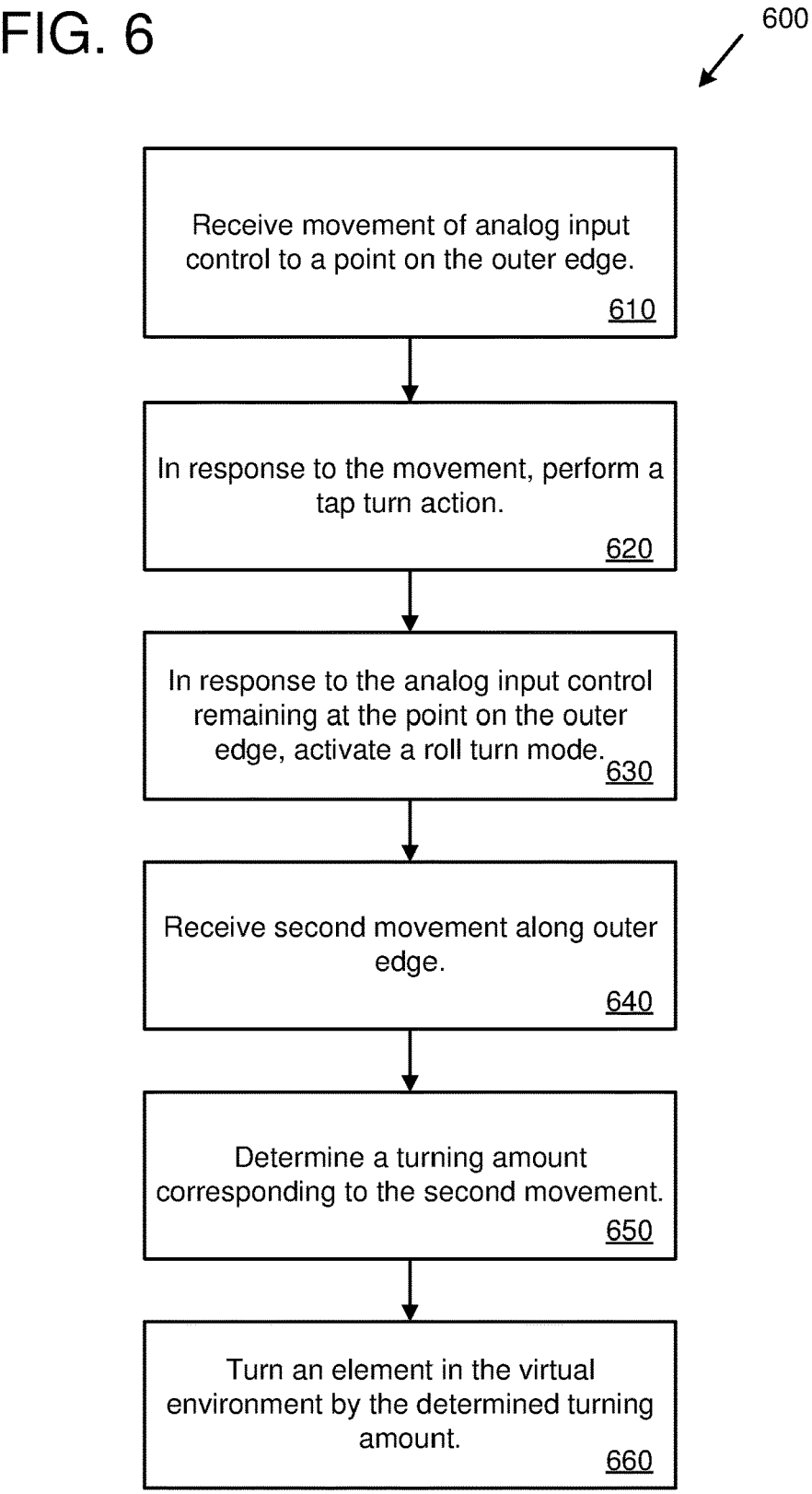
FIG. 6 is a diagram depicting an example method for tap turning and roll turning in a virtual reality environment.

FIG. 6 is a flowchart of an example method 600 for tap turning and roll turning in a virtual reality environment (e.g., for rotating a user's avatar in the virtual reality environment). At 610, a movement is received via an analog input control. The movement is a movement of the analog input control to a point on the outer edge of the analog input control. In some implementations, the movement starts from a center location of the analog input control and then moves to the point on the outer edge.

At 620 a tap turn action is performed in response to the movement received at 610. The tap turn action turns an element in the virtual environment according to the location of the point on the outer edge. For example, the tap turning can be performed by determining an angle and a direction from a default position to the point on the outer edge. In some implementations, the default position is at the top or forward position of the analog input control. Other implementations may use a different default position, or a user-configurable default position. The element in the virtual environment is then turned proportional to the determined angle and in the determined direction. In some implementations, the amount turned is equal to the determined angle (a one-to-one relationship). In some implementations, the amount turned is scaled (e.g., by one-half, one-third, or by another amount, which could be a default setting or a user-configurable setting). In some implementations, the turning is performed in a stuttered manner.

At 630, a roll turn mode is activated in response to the analog input control remaining at the point on the outer edge. While in the roll turn mode, at 640 a second movement is received along the outer edge of the analog input control. At 650, a turning amount is determined corresponding to the second movement (e.g., a one-to-one relationship or a scaled amount). At 660, the element in the virtual environment is turned by the determined turning amount in the direction of the movement along the outer edge.

For example, the method 600 can be performed by a user to first initiate a tap turn to any desired location and then perform a roll turn to perform an additional turning amount. For example, the user could tap turn 120 degrees to the left to immediately turn the user's avatar that amount (or a scaled amount) and then hold the control at that position and rotate to fine tune the movement (e.g., to turn a small number of additional degrees clockwise or counter-clockwise at a user controlled speed).

Computing Systems

Figure 7:
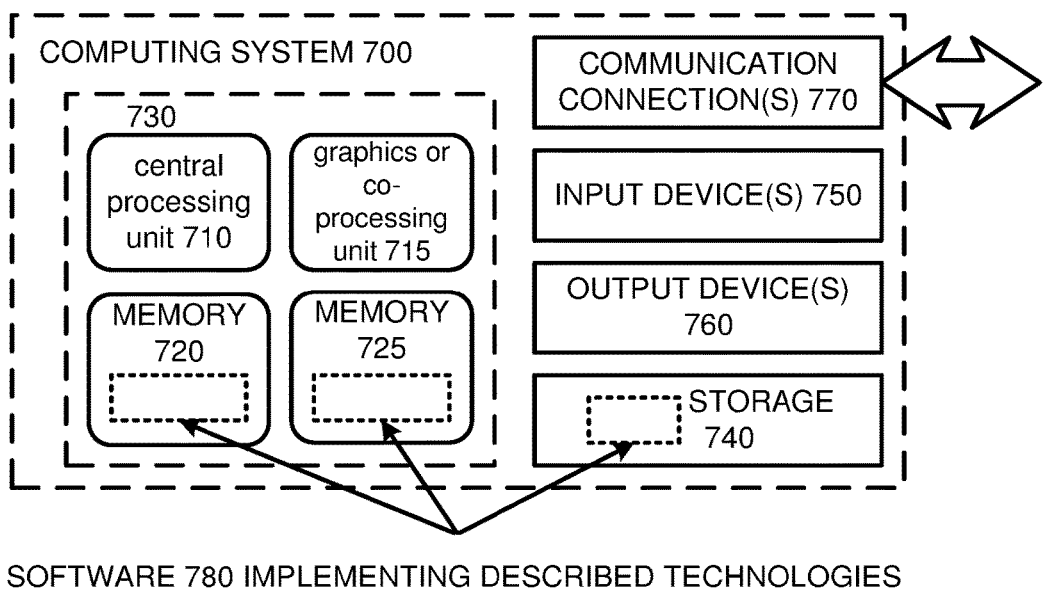
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, such as 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processing unit; and
   memory;
   the computing device configured to perform operations for turning in a virtual environment, the operations comprising:
      receiving, from a user via an analog input control, a first movement of the analog input control to a border region of the analog input control;
      determining a point where the first movement reaches the border region;
      in response to the first movement of the analog input control, activating a roll turn mode, wherein activation of the roll turn mode does not result in any turning of an element in the virtual environment regardless of the point where the first movement reaches the border region;
      while in the roll turn mode:
         receiving a second movement of the analog input control along the border region of the analog input control;
         determining a turning amount corresponding to the second movement; and
         turning the element in the virtual environment by the determined turning amount;
      wherein any turning of the element in the virtual environment only begins after receiving the second movement.

2. The computing device of claim 1 wherein the analog input control is one of an analog stick of a game controller, a touchpad, a trackball, or a gesture recognition system.

3. The computing device of claim 1 wherein the virtual environment is a virtual reality or augmented reality environment generated, at least in part, by the computing device, and wherein the element in the virtual environment is an avatar of the user.

4. The computing device of claim 1 wherein movement using the analog input control before it reaches the border region does not result in any turning of the element in the virtual environment.

5. The computing device of claim 1 wherein the roll turn mode is only activated once the first movement reaches the border region of the analog input control.

6. The computing device of claim 1 wherein determining the turning amount corresponding to the second movement comprises:
   determining a distance and direction traveled, according to the second movement, around the border region from the point.

7. The computing device of claim 6 wherein turning the element in the virtual environment comprises:
   rotating the element in the virtual environment a number of degrees proportional to the determined distance and in the determined direction.

8. The computing device of claim 6 wherein the determined distance is a number of degrees that is scaled by a scaling factor.

9. The computing device of claim 6 wherein stuttering is applied when determining the distance, and wherein the turning amount is in a number of stuttering increments.

10. The computing device of claim 1, the operations further comprising:
receiving, via the analog input control, a third movement of the analog input control, wherein the third movement moves from a center location to a second point on the border region;
in response to the third movement of the analog input control, performing a tap turn action comprising:
determining a difference in degrees and a direction between a default position and the second point; and
turning the element in the virtual environment proportional to the difference in degrees and in the determined direction.

11. The computing device of claim 10, wherein performing the tap turn action further comprises:
scaling the difference in degrees by a scaling factor.

12. A method, implemented by a computing device, for turning in a virtual environment, the method comprising:
receiving, from a user via an analog input control, a first movement of the analog input control to a border region of the analog input control;
determining a point where the first movement reaches the border region;
in response to the first movement of the analog input control, activating a roll turn mode, wherein activation of the roll turn mode does not result in any turning of an element in the virtual environment regardless of the point where the first movement reaches the border region;
while in the roll turn mode:
receiving a second movement of the analog input control along the border region of the analog input control;
determining a turning amount corresponding to the second movement; and
turning the element in the virtual environment by the determined turning amount;
wherein any turning of the element in the virtual environment only begins after receiving the second movement.

13. The method of claim 12 wherein the virtual environment is a virtual reality or augmented reality environment generated, at least in part, by the computing device, and wherein the element in the virtual environment is an avatar of the user.

14. The method of claim 12 wherein determining the turning amount corresponding to the second movement comprises:
determining a distance and direction traveled, according to the second movement, around the border region from the point;
wherein turning the element in the virtual environment comprises:
rotating the element in the virtual environment a number of degrees proportional to the determined distance and in the determined direction.

15. The method of claim 14 wherein the determined distance is the number of degrees that is scaled by a scaling factor.

16. The method of claim 14 wherein stuttering is applied when determining the distance, and wherein the turning amount is in a number of stuttering increments.

17. A computer-readable storage medium storing computer-executable instructions for causing a computing device to perform operations for turning in a virtual environment, the operations comprising:
receiving, from a user via an analog input control, a first movement of the analog input control to a border region of the analog input control;
determining a point where the first movement reaches the border region;
in response to the first movement of the analog input control, activating a roll turn mode, wherein activation of the roll turn mode does not result in any turning of an element in the virtual environment regardless of the point where the first movement reaches the border region;
while in the roll turn mode:
receiving a second movement of the analog input control along the border region of the analog input control;
determining a turning amount corresponding to the second movement; and
turning the element in the virtual environment by the determined turning amount;
wherein any turning of the element in the virtual environment only begins after receiving the second movement.

18. The computer-readable storage medium of claim 17 wherein determining the turning amount corresponding to the second movement comprises:
determining a distance and direction traveled, according to the second movement, around the border region from the point;
wherein turning the element in the virtual environment comprises:
rotating the element in the virtual environment a number of degrees proportional to the determined distance and in the determined direction.

19. The computer-readable storage medium of claim 18 wherein the determined distance is the number of degrees that is scaled by a sealing factor.

20. The computer-readable storage medium of claim 18 wherein stuttering is applied when determining the distance, and wherein the turning amount is in a number of stuttering increments.

* * * * *